US008784178B2

(12) United States Patent
Adams et al.

(10) Patent No.: US 8,784,178 B2
(45) Date of Patent: Jul. 22, 2014

(54) LOTTERIZED ONLINE GAMING WITH MULTIPLE VIRTUAL CURRENCIES

(75) Inventors: Cameron Adams, Kamloops (CA); George Rassias, Toronto (CA); Eric Roy, Moncton (CA); Jason Lam, Vancouver (CA); Ken Schulzke, Winnipeg (CA); Louis-Philippe Lussier, Moncton (CA); Serge Roy, St-Joseph-du-Lac (CA); Todd Heintz, Vancouver (CA)

(73) Assignee: Interprovincial Lottery Corporation, Toronto (CA)

( * ) Notice: Subject to any disclaimer, the term of this patent is extended or adjusted under 35 U.S.C. 154(b) by 0 days.

(21) Appl. No.: 13/345,923

(22) Filed: Jan. 9, 2012

(65) Prior Publication Data

US 2012/0178515 A1 Jul. 12, 2012

Related U.S. Application Data

(60) Provisional application No. 61/430,889, filed on Jan. 7, 2011, provisional application No. 61/492,644, filed on Jun. 2, 2011, provisional application No. 61/492,702, filed on Jun. 2, 2011.

(51) Int. Cl.
*A63F 13/00* (2006.01)

(52) U.S. Cl.
USPC .................... 463/17; 463/25; 463/29; 463/42

(58) Field of Classification Search
USPC ......................................... 463/17, 25, 29, 42
See application file for complete search history.

(56) References Cited

U.S. PATENT DOCUMENTS

| | | | | |
|---|---|---|---|---|
| 2002/0093136 | A1 | 7/2002 | Moody | |
| 2007/0124239 | A1 * | 5/2007 | Jung et al. | 705/38 |
| 2008/0119284 | A1 | 5/2008 | Luciano, Jr. et al. | |
| 2008/0242399 | A1 * | 10/2008 | Toneguzzo | 463/25 |
| 2009/0117970 | A1 | 5/2009 | De Waal et al. | |
| 2009/0319363 | A1 * | 12/2009 | Callaghan et al. | 705/14.36 |
| 2010/0022290 | A1 * | 1/2010 | Oakes et al. | 463/17 |
| 2011/0035264 | A1 | 2/2011 | Zaloom | |
| 2011/0105213 | A1 * | 5/2011 | Irwin et al. | 463/17 |
| 2011/0244952 | A1 | 10/2011 | Schueller et al. | |

OTHER PUBLICATIONS

Wikipedia.org, "Gaia Online", Jul. 9, 2010. Found at: http://web.archive/org/web/20100709182019/http://en.wikipedia.org/wiki/Gaia_online.
Au, "Move over MySpace, Gaia Online is Here", Apr. 22, 2007. Found at: http://gigaom.com/2007/04/22/move-over-myspace-gaia-online-is-here/.
Information Disclosure statement filed on U.S. Appl. No. 13/345,908 to first named inventor Schulzke, Ken, Dated Jun. 19, 2012.
International Search Report; date of mailing Mar. 19, 2012, for International Application No. PCT/CA2012/050009.
International Search Report, date of mailing Mar. 8, 2012, for International Application No. PCT/CA2012/050008.

* cited by examiner

*Primary Examiner* — James S McClellan
(74) *Attorney, Agent, or Firm* — Norton Rose Fulbright Canada LLP

(57) ABSTRACT

There is an interactive video game having a lotterized aspect incorporated therein. In addition to the traditional interactive video game, instant and future win opportunities are presented to the player throughout the game. The game and win opportunities are played with a plurality of virtual currencies, the virtual currencies comprising credits for purchasing virtual goods in the game play instance, tokens applicable within the game play instance for participating in the real world lottery, and gifts representative of virtual goods exchangeable between players.

16 Claims, 11 Drawing Sheets

CARS

| SUB-CATEGORY | LEVEL | ITEMS |
|---|---|---|
| SEDANS | 1 | 1.<br>2.<br>3.<br>4.<br>5.<br>6.<br>7.<br>8.<br><br>SPECIAL ITEMS<br>1.<br>2. |
| SUB-CATEGORY | LEVEL | ITEMS |
| SEDANS | 2 | 1.<br>2.<br>3.<br>4.<br>5.<br>6.<br>7.<br>8.<br><br>SPECIAL ITEMS<br>1.<br>2. |
| SUB-CATEGORY | LEVEL | ITEMS |
| SEDANS | 3 | 1.<br>2.<br>3.<br>4.<br>5.<br>6.<br>7.<br>8.<br><br>SPECIAL ITEMS<br>1.<br>2. |

FIGURE 3

LOTTERIZED ONLINE GAMING WITH MULTIPLE VIRTUAL CURRENCIES

CROSS-REFERENCE TO RELATED APPLICATIONS

The present application claims priority under 35 USC 119 (e) of U.S. Provisional Patent Application No. 61/492,702, filed on Jun. 2, 2011, U.S. Provisional Patent Application No. 61/492,644, filed on Jun. 2, 2011, and U.S. Provisional Application No. 61/430,889, filed on Jan. 7, 2011, the contents of which are hereby incorporated by reference.

TECHNICAL FIELD

The present invention relates to the field of online gaming and more particularly, online gaming incorporating a lotterized aspect therein and the management of various types of virtual currencies.

BACKGROUND OF THE ART

An online game is a game played over some form of a computer network, such as the Internet. The expansion of online gaming has reflected the overall expansion of computer networks from small local networks to the Internet and the growth of Internet access itself. Online games can range from simple text based games to games incorporating complex graphics and virtual worlds populated by many players simultaneously. Many online games have associated online communities, making online games a form of social activity beyond single player games.

A lottery is a form of gambling which involves the drawing of lots for a prize and it may come in various formats. For example, the prize can be a fixed amount of cash or goods. Alternatively, the prize may be a fixed percentage of the receipts, such as a "50-50" draw, where the prize is 50% of the revenue.

The demographics targeted and attracted to online games vs. lottery games vary widely. Providers of such games are always looking for ways to increase the population segments that will show an interest in either type of game.

SUMMARY

There is described herein an interactive video game having a lotterized aspect incorporated therein. In addition to the traditional interactive video game, instant and future win opportunities are presented to the player throughout the game. The game and win opportunities are played with a plurality of virtual currencies, the virtual currencies comprising credits for purchasing virtual goods in the game play instance, tokens applicable within the game play instance for participating in the real world lottery, and gifts representative of virtual goods exchangeable between players.

In accordance with a first broad aspect, there is provided a system for executing an interactive video game having a lotterized component, the system comprising: at least one computer server communicable with at least one client computing device over a network, the server having a processor and a memory; a gaming engine module stored on the memory and executable by the processor, the gaming engine module having program code that when executed, generates an interactive game play instance playable on the client computing device; a lottery services module stored on the memory and executable by the processor, the lottery services module having program code that when executed, conducts a real world lottery transaction within the game play instance; and a virtual currency module stored on the memory and executable by the processor, the virtual currency module having program code that when executed, issues and manages separately credits for purchasing virtual goods in the game play instance, tokens applicable within the game play instance for participating in the real world lottery, and gifts representative of virtual goods exchangeable between players.

In some embodiments, the game play instance corresponds to a collecting game simulating a shopping experience. The collecting game may require players to collect sets of virtual goods in order to obtain an opportunity to win real-world equivalents of the virtual goods. Such opportunities may only be provided when predefined sets of the virtual goods have been completed.

In accordance with another broad aspect, there is provided a computer-implemented method for providing an interactive video game having a lotterized component, the method comprising executing on a processor program code for: generating an interactive game play instance playable on the client computing device; conducting a real world lottery transaction within the game play instance; and issuing and managing separately virtual currency in the interactive video game, the virtual currency comprising credits for purchasing virtual goods in the game play instance, tokens applicable within the game play instance for participating in the real world lottery, and gifts representative of virtual goods exchangeable between players.

In accordance with yet another aspect, there is provided a computer readable medium having stored thereon program code executable by a processor for providing an interactive video game having a lotterized component, the program code executable for: generating an interactive game play instance playable on the client computing device; conducting a real world lottery transaction within the game play instance; and issuing and managing separately virtual currency in the interactive video game, the virtual currency comprising credits for purchasing virtual goods in the game play instance, tokens applicable within the game play instance for participating in the real world lottery, and gifts representative of virtual goods exchangeable between players.

In this specification, the term "virtual credits" is intended to mean a virtual currency used in a virtual world to purchase virtual items, without possibility for conversion to a real world currency. The term "tokens" refers to a virtual currency applicable in a virtual world to obtain win opportunities to win real world prizes. The term "win opportunities" refers to instant chances to win a real world prize via a lottery or other type of gambling game, and/or future chances to enter a draw to win a real world prize. The term "gifts" refers to virtual items that players may send to friends in the virtual world. In some instances, the gifts are special virtual items not available to a player except through gifting.

BRIEF DESCRIPTION OF THE DRAWINGS

Further features and advantages of the present invention will become apparent from the following detailed description, taken in combination with the appended drawings, in which:

FIG. 3 is a schematic illustration of an exemplary tool used by a player for record-keeping;

It will be noted that throughout the appended drawings, like features are identified by like reference numerals.

DETAILED DESCRIPTION

Figure 1:
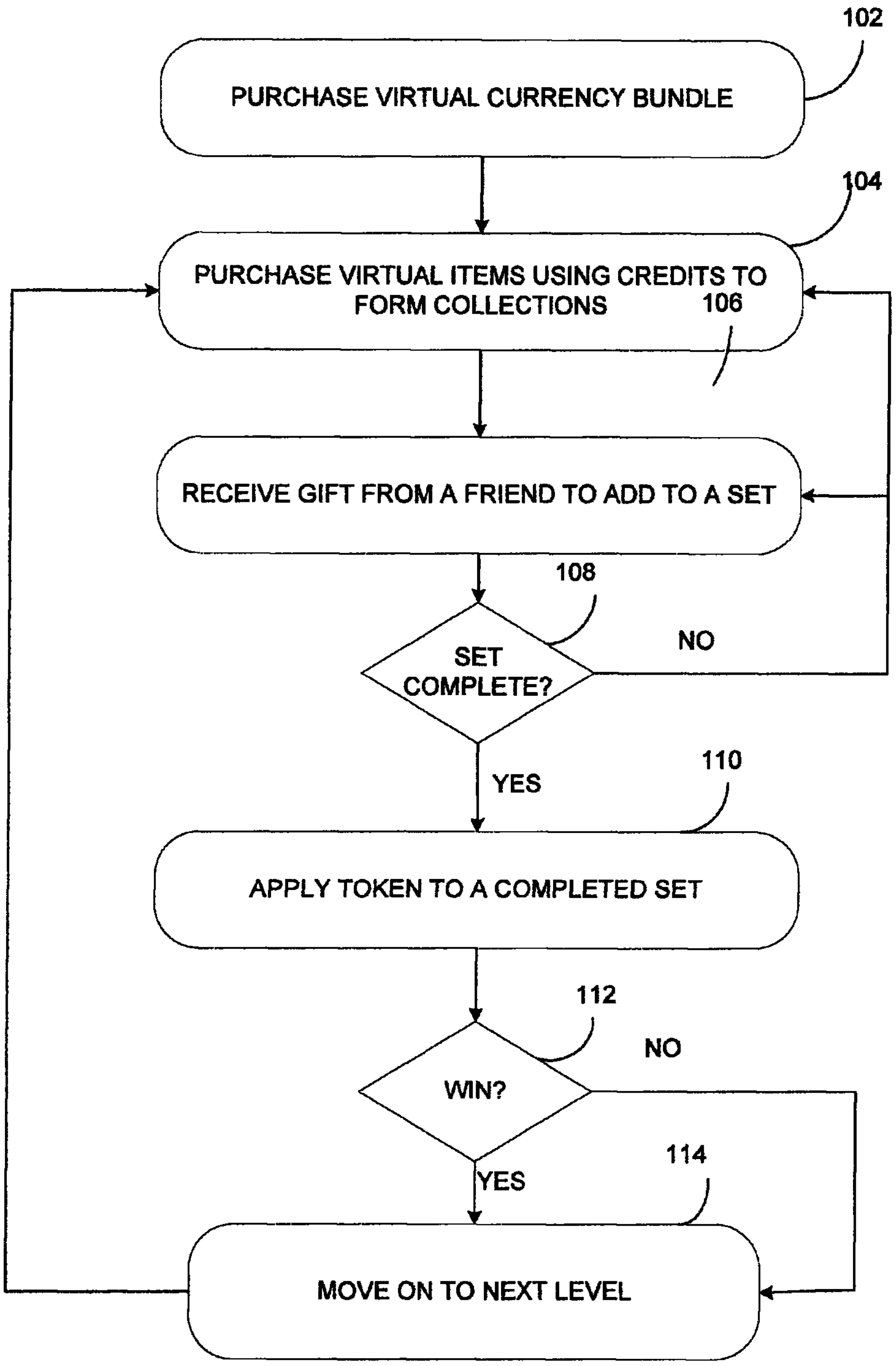
FIG. 1 is a flowchart illustrating an exemplary lotterized video game.

FIG. 1 is a flow-chart illustrating an exemplary lotterized video game. In this embodiment, the interactive video game is a collecting game that uses a shopping metaphor in order to provide a simulated environment. Virtual items are organized into sets and players advance through the game by completing sets when they acquire all of the virtual items of a given set. Advancement in the game may cause the players to gain access to increasingly valuable and exclusive virtual items for their collections. Players may earn win opportunities in the real world via the interactive game. The win opportunities may correspond to real-world items from the collected sets, money, or participations in an instant or future lottery draw.

Players may participate in the lotterized video game by first purchasing a virtual currency bundle 102. This is how the game is monetized. Each bundle may comprise an amount of credits used to purchase virtual goods (i.e. the virtual items to be collected into a set), a number of tokens applicable in the virtual game for win opportunities, and a number of gifts.

Credits are used to purchase virtual items in collections. Credits cannot be converted into cash or prizes and so can be used to provide an incentive for any activity that the game operator wishes to encourage. For example, players can be paid in credits for engaging in an activity that adds value to the game, such as sending invitations or gifts to friends.

Tokens represent lotterized opportunities to win prizes. In some embodiments, players may apply tokens to completed sets for an opportunity to win a prize from that set. Alternative win opportunities using tokens include instant win prizes and future participations in a lottery draw. Since tokens can be converted into cash or prizes, they are to be controlled in the game economy.

Gifts are items players can send to friends to encourage them to play the game as well. In one embodiment, a daily gift is provided to a player each time he returns to the game. This gift allows the player to send a virtual item to a friend. The virtual item may then become an item in the friend's collection. In an alternative embodiment, a player is allowed to gift a double of an item that has already been purchased using credits and therefore forms part of his collection. Other possible variations on gifting will be understood by those skilled in the art.

In some embodiments, a wish list is used to inform other players of virtual items that players would like to receive as a gift from friends. Players may be informed which of their friends have put a given item on their wish list, or which friends have made updates to their wish list. In some embodiments, players can increase their social status in the game by sending gifts that their friends have indicated they would like to receive, as well as increase the likelihood of their friends reciprocating with gifts they themselves need.

Virtual currency bundles may be purchased on a one-time basis, as part of a regular subscription, or in the form of a micro-transaction. The subscription may be on a daily, weekly; monthly, or yearly basis, or according to any other desired frequency. The amounts of credits, tokens, and gifts making up a virtual bundle may be fixed or they may vary as a function of a purchase price. For example, $3.00 may buy 500 credits, 6 tokens and 3 gifts; $5.00 may buy 800 credits, 12 tokens, 9 gifts; $10.00 may buy 2000 credits, 30 tokens, and 15 gifts. An exclusive subscription may correspond to $10.00/week in order to obtain 2100 credits, 35 tokens, and 25 gifts. Other combinations of credits, tokens, and gifts are also possible. Micro-transactions may be done using either a lottery jurisdiction wallet or one of several other micro-transaction systems provided by various vendors, such as Apple™, Facebook™, PayByPhone™, etc.

Once a player has purchased a virtual currency bundle, they may begin to play the interactive video game. In the present context, this means purchasing virtual items using credits to form collections 104. The virtual items may be provided to the players in various formats, such as in an auction setting, in a virtual shopping mall, via a scavenger hunt in a virtual world, etc.

In one embodiment, the player may only complete a set by receiving a gift from a friend 106. If the gift is provided before the set is complete 108, the player continues to collect items until the set is completed. If the set is completed, the player may have the opportunity to apply a token to a completed set 110 and gain a win opportunity 112. Whether the token results in a win or not, the player may then advance in the game by proceeding to a next level 114 and beginning the process of collecting other virtual items using accumulated credits 104.

Figure 2:
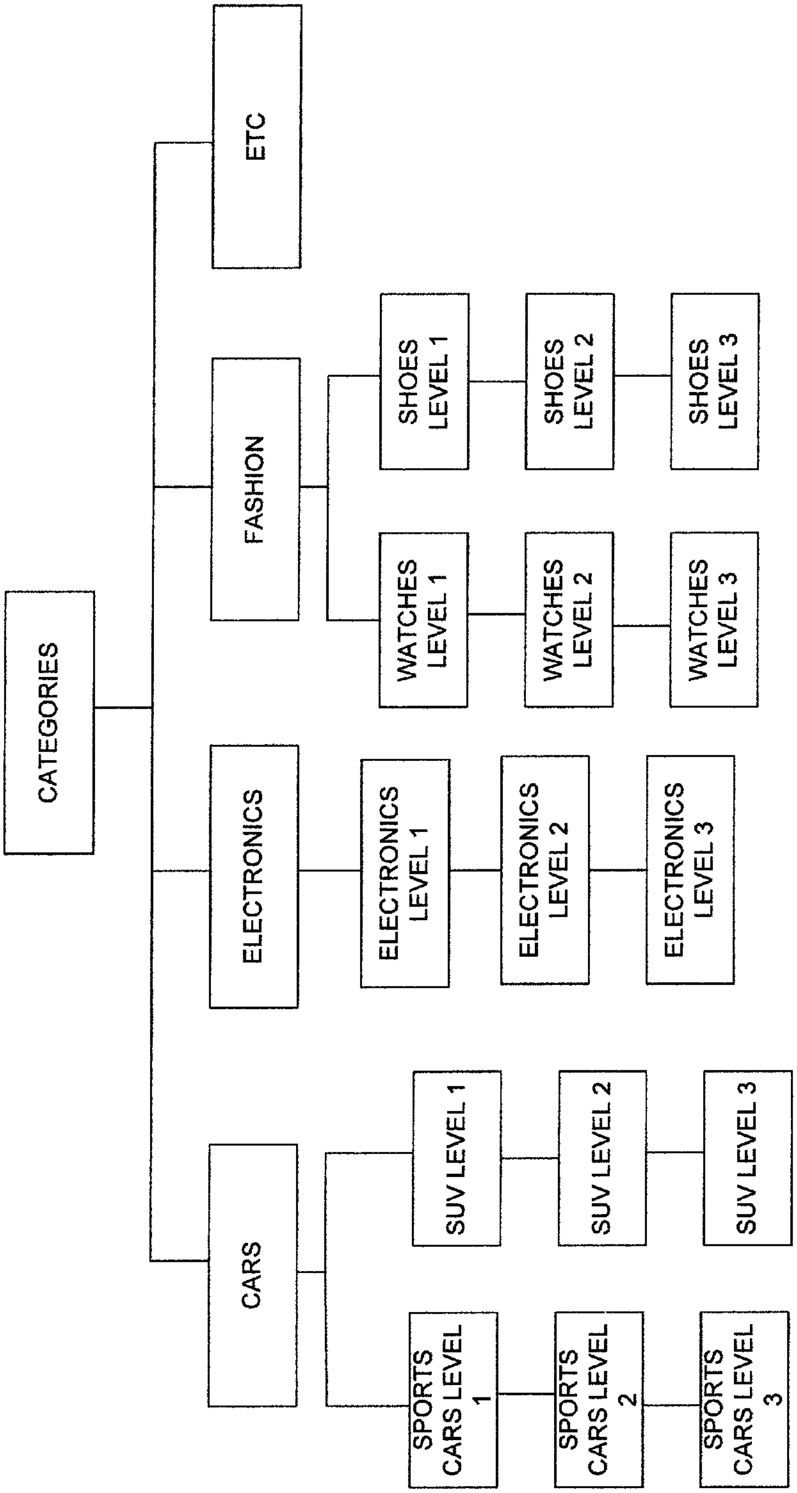
FIG. 2 is a schematic illustration of an exemplary organization of virtual items into categories and levels.

Virtual items for collection may be organized into categories, which may contain sub-categories, and further organized into a hierarchy based on the value of the items. Categories or sub-categories may contain collections organized into levels, which themselves may contain the individual items to be collected. An exemplary organizational structure is illustrated in FIG. 2. Players drill into a category and may be presented with a selection of virtual items to choose from, organized into collections. At first, only level one collections are available to a player. In some embodiments, the players may be able to see higher level collections, although they cannot access the contents. For example, they may be able to see and purchase the contents of the "entry level sedan" collection and they can see that there is a "luxury sedan" collection, but they cannot see or purchase any of the items in the "luxury sedan" collection. Players must first purchase all of the items in the level 1 collection in a category in order to unlock the level 2 collection in that category.

In one exemplary embodiment, each collection consists of a given number of items to collect, such as twelve. Of these twelve items, a given number can be purchased by the player using virtual credits, such as ten. The remaining number of items, in this case two, are special items that can only be received as a gift from another player and cannot be purchased by a player using virtual credits. Additional items, either regular or special, may be available in a set from time to time as a special feature. A player completes a collection by acquiring credits and using them to purchase the items in a set. FIG. 3 is an exemplary tool used by the player to keep track of collected items.

A collection may be considered complete when the ten purchasable items are acquired. When the player has all twelve items in a collection (ten purchased items+two gifted items), the collection may be given a special treatment, such as an animation or screen hint. This indicates to the player that a token can now be applied to win prizes. The prizes may be an item taken directly from the collection or another item, such as a cash prize or a lottery draw ticket. Special time-limited items may appear from time to time to create additional interest.

The application of the tokens constitutes the lotterization of the interactive video game. Players ca win instantly, daily, weekly, or on any other desired basis by applying tokens to completed sets. Players may also gain additional entries into daily or weekly draws as a reward for particular in-game actions, such as completing a set, sending another player a gift, sending a fried an invitation to join a game, having the friend accept the invitation, etc. The interface used to apply the draw and instant win token may be embedded directly into the simulated virtual world. For example, once a player completes a set, the presentation of the set changes to make it clear to the player that a token may be applied for a real world win opportunity. If a player applies a token at that instant, a token wallet, on display to the player, is decremented by one and the player is subsequently informed of a win or loss.

Additional features, such as achievement badges, special offers, notifications, draw alerts, and promotions on virtual goods and currency may also be provided in the game. Various social components of existing massive multi-player online games, such as invitations, friend lists, and activities/news feeds may be incorporated as well. Leader boards may be used to show various aspects of the game, such as depth of play (players with the most level 3 sets), breadth of play (players who have completed the most categories), cash wins (players who have won the most draws), collecting activities (players who are the biggest spenders), and social status (players with the most completed sets). In some instances, a player accepting an invitation to play the game may immediately be offered one or more win opportunities for real world prizes.

A concierge or helper may be provided to guide the player through the various steps of the interactive video game and the lotterized component of the game. The concierge or helper may act as a tutor, especially when the player is just starting out.

Figure 4:
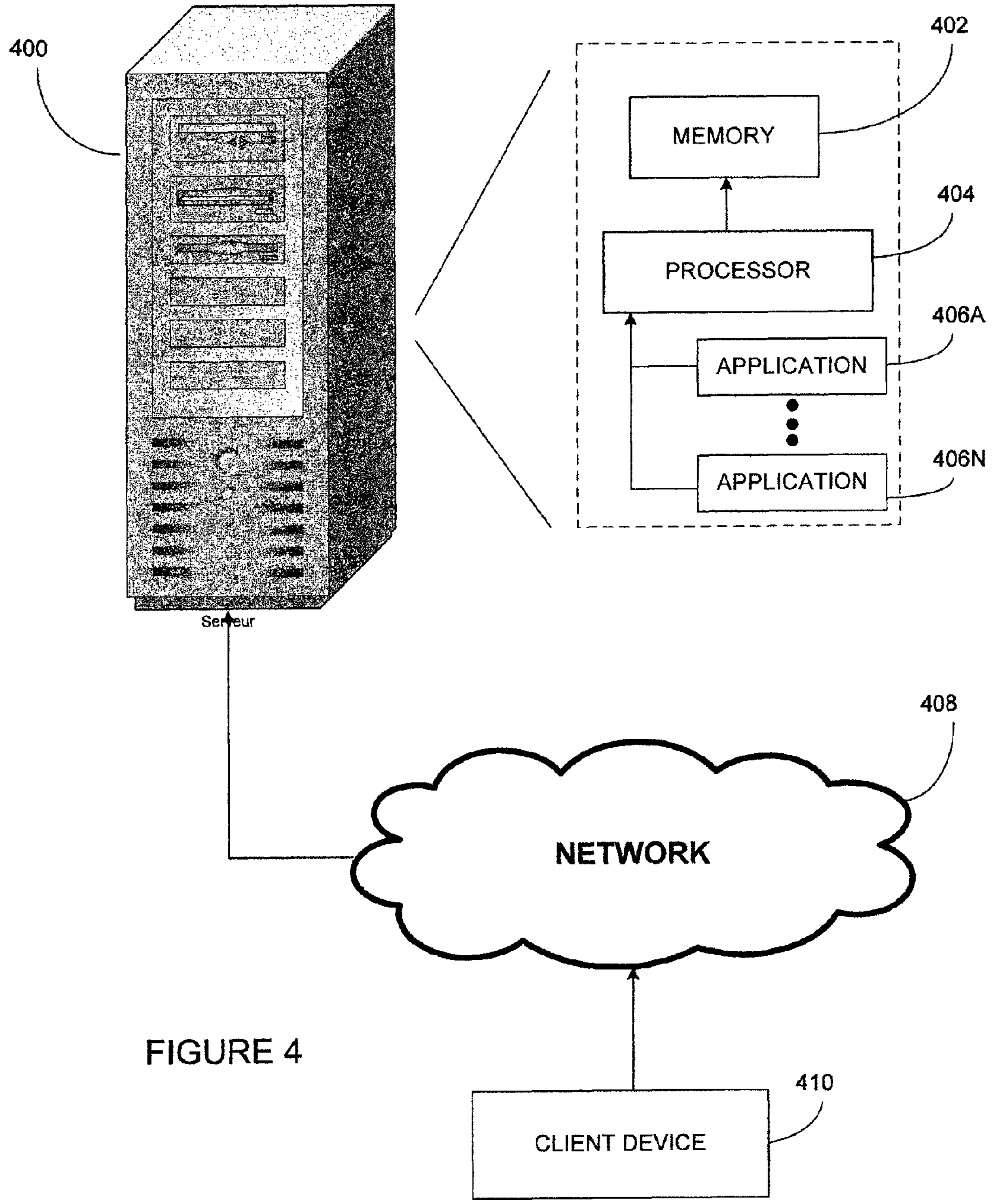
FIG. 4 is a schematic illustration of a system for executing a lotterized video game, in accordance with one embodiment.

Referring to FIG. 4, there is illustrated a system for executing the lotterized video game. One or more server(s) are provided remotely and accessible via a network 408. For example, a series of servers corresponding to a web server, an application server, a database server, and a lottery server may be used. These servers are all represented by server 400 in FIG. 1. The server 400 is accessed by a client device 410, such as a telephone, a computer, a personal digital assistant (PDA), an Iphone™, etc, via any type of network 408, such as the Internet, the Public Switch Telephone Network (PSTN), a cellular network, or others known to those skilled in the art.

The server 400 comprises, amongst other things, a plurality of applications 406*a* . . . 406*n* running on a processor 404, the processor being coupled to a memory 402. It should be understood that while the applications 406*a* . . . 406*n* presented herein are illustrated and described as separate entities, they may be combined or separated in a variety of ways.

One or more databases (not shown) may be integrated directly into memory 402 or may be provided separately therefrom and remotely from the server 400. In the case of a remote access to the databases, access may occur via any type of network 408, as indicated above. The various databases described herein may be provided as collections of data or information organized for rapid search and retrieval by a computer. They are structured to facilitate storage, retrieval, modification, and deletion of data in conjunction with various data-processing operations. They may consist of a file or sets of files that can be broken down into records, each of which consists of one or more fields. Database information may be retrieved through queries using keywords and sorting commands, in order to rapidly search, rearrange, group, and select the field. The databases may be any organization of data on a data storage medium, such as one or more servers.

In one embodiment, the databases are secure web servers and Hypertext Transport Protocol Secure (HTTPS) capable of supporting Transport Layer Security (TLS), which is a protocol used for access to the data. Communications to and from the secure web servers may be secured using Secure Sockets Layer (SSL). An SSL session may be started by sending a request to the Web server with an HTTPS prefix in the URL, which causes port number “443” to be placed into the packets. Port “443” is the number assigned to the SSL application on the server. Identity verification of a user may be performed using usernames and passwords for all users. Various levels of access rights may be provided to multiple levels of users.

Alternatively, any known communication protocols that enable devices within a computer network to exchange information may be used. Examples of protocols are as follows: IP (Internet Protocol), UDP (User Datagram Protocol), TCP (Transmission Control Protocol), DHCP (Dynamic Host Configuration Protocol), HTTP (Hypertext Transfer Protocol), FTP (File Transfer Protocol), Telnet (Telnet Remote Protocol), SSH (Secure Shell Remote Protocol), POP3 (Post Office Protocol 3), SMTP (Simple Mail Transfer Protocol), IMAP (Internet Message Access Protocol), SOAP (Simple Object Access Protocol), PPP (Point-to-Point Protocol), RFB (Remote Frame buffer) Protocol.

The memory 402 accessible by the processor 404 receives and stores data. The memory 402 may be a main memory, such as a high speed Random Access Memory (RAM), or an auxiliary storage unit, such as a hard disk, a floppy disk, or a magnetic tape drive. The memory may be any other type of memory, such as a Read-Only Memory (ROM), or optical storage media such as a videodisc and a compact disc.

The processor 404 may access the memory 402 to retrieve data. The processor 404 may be any device that can perform operations on data. Examples are a central processing unit (CPU), a front-end processor, a microprocessor, a graphics processing unit (GPUNPU), a physics processing unit (PPU), a digital signal processor, and a network processor. The applications 106*a* . . . 106*n* are coupled to the processor 404 and configured to perform various tasks as explained below in more detail. An output may be transmitted to the client device 410.

Figure 5:
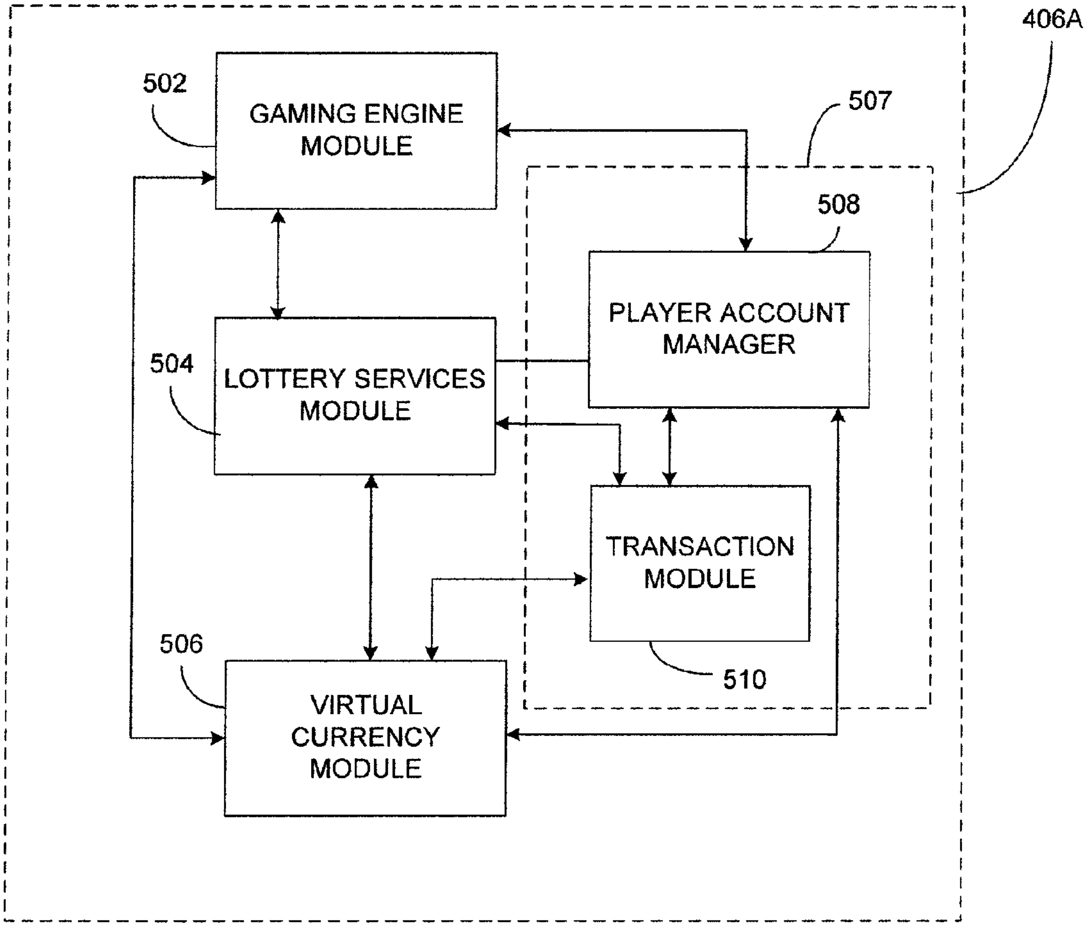
FIG. 5 is a block diagram illustrating an exemplary application running on the processor of the system of FIG. 4.

FIG. 5 illustrates an exemplary application 406*a* running on the processor 404. The application 406*a* comprises at least a gaming engine module 502, a lottery services module 504, and a virtual currency module 506. These three modules interact together in order to provide the lotterized video game that is executable by the processor 404 over the network 108. The lotterized video game can conduct a lottery transaction within an interactive game play instance which issues a real lottery ticket from a government sanctioned lottery authority.

A management module 507 is illustrated as comprising a player account manager 508 and a transaction module 510. The transaction module 510 is involved in the real world transactional aspects of the game. Real world transactions are involved when players purchase virtual currencies and when players are awarded cash or other real world prizes via the integrated lotteries. Therefore, the transaction module 510 interacts with the lottery services module 504 and the virtual currency module 506 to manage the transactions. The transaction module 510 also interacts with the player account manager 508. The player account manager 508 is responsible for managing player account functions, such as creating a player account, validating an existing player's login and password or a new player's eligibility to play the game, suspending a player's account, activating a player account, creating a player profile, viewing a player profile, viewing a current balance of a player's real money in a player account, updating a current balance of a player's real money account, and updating a player's virtual ranking/status.

Figure 6:
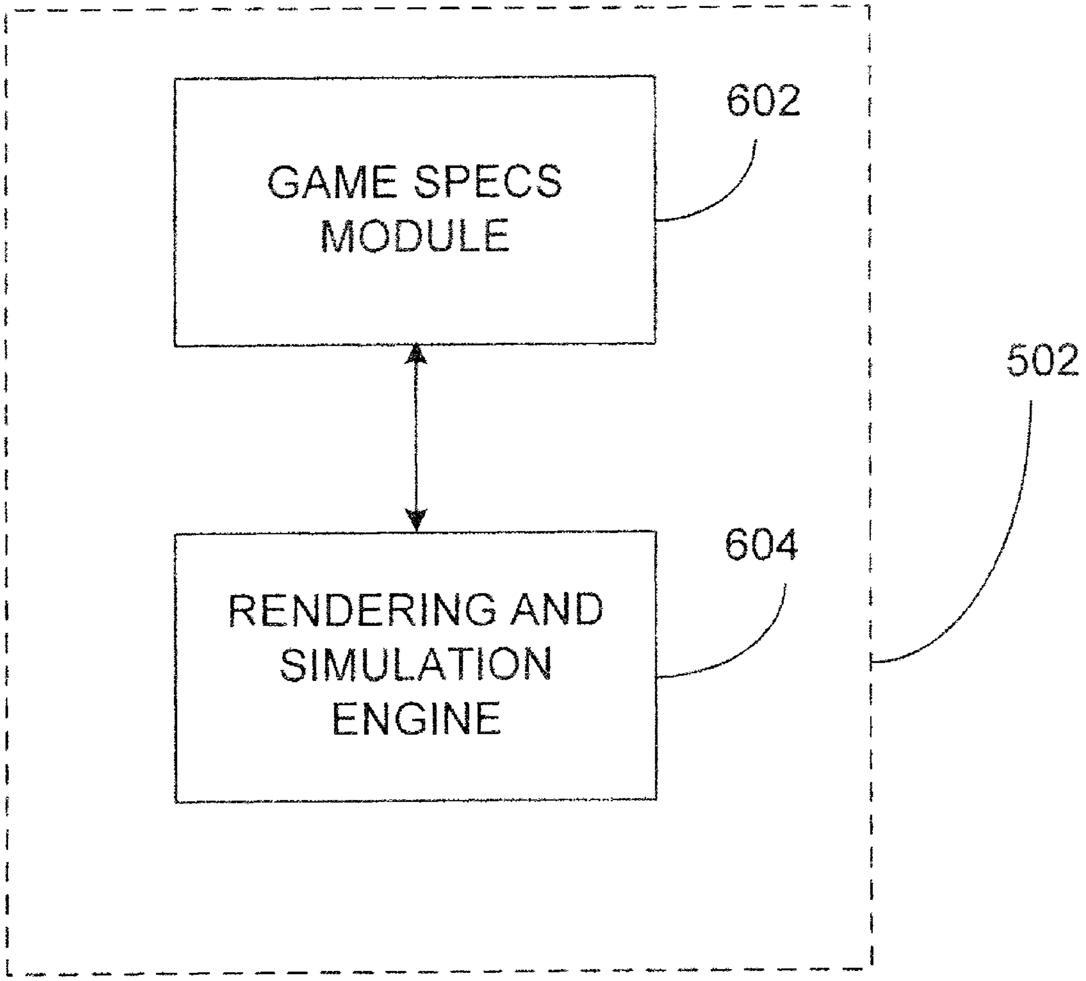
FIG. 6 is a block diagram illustrating an exemplary gaming engine module for the application of FIG. 5.

The gaming engine module 502 is a flexible and reusable software platform which provides core functionalities needed to develop a game application. This module may be responsible for all aspects of the lotterized video game that relate directly to the interactive game, namely the simulated shopping experience. FIG. 6 is a simplified block diagram of an exemplary embodiment of the gaming engine module 502. A game specs module 602 contains specific gaming logic and instructs a rendering and simulation engine 604 to create the virtual world and render images in accordance with this logic. For example, if a player finishes a first level and wishes to continue to a second level, the game specs module 602 will instruct the rendering and simulation engine 604 to display the items available in the second level of the game for the user to purchase. In another example, when a given action occurs in a game, such as the player requesting access to a given store in a virtual shopping mall, the game specs module 602 will instruct the rendering and simulation engine 604 to render the appropriate graphics and display these graphs within the simulated gaming environment. For simplicity, other features of the gaming engine module 502 typically present in such a software platform are not illustrated. Examples of these other features relate to functionalities such as collision detection (and collision response), sound, scripting, animation, artificial intelligence, networking, streaming, memory management, threading, localization support, and a scene graph. These functionalities will be readily understood to be included in the present description by a person skilled in the art.

Figure 7:
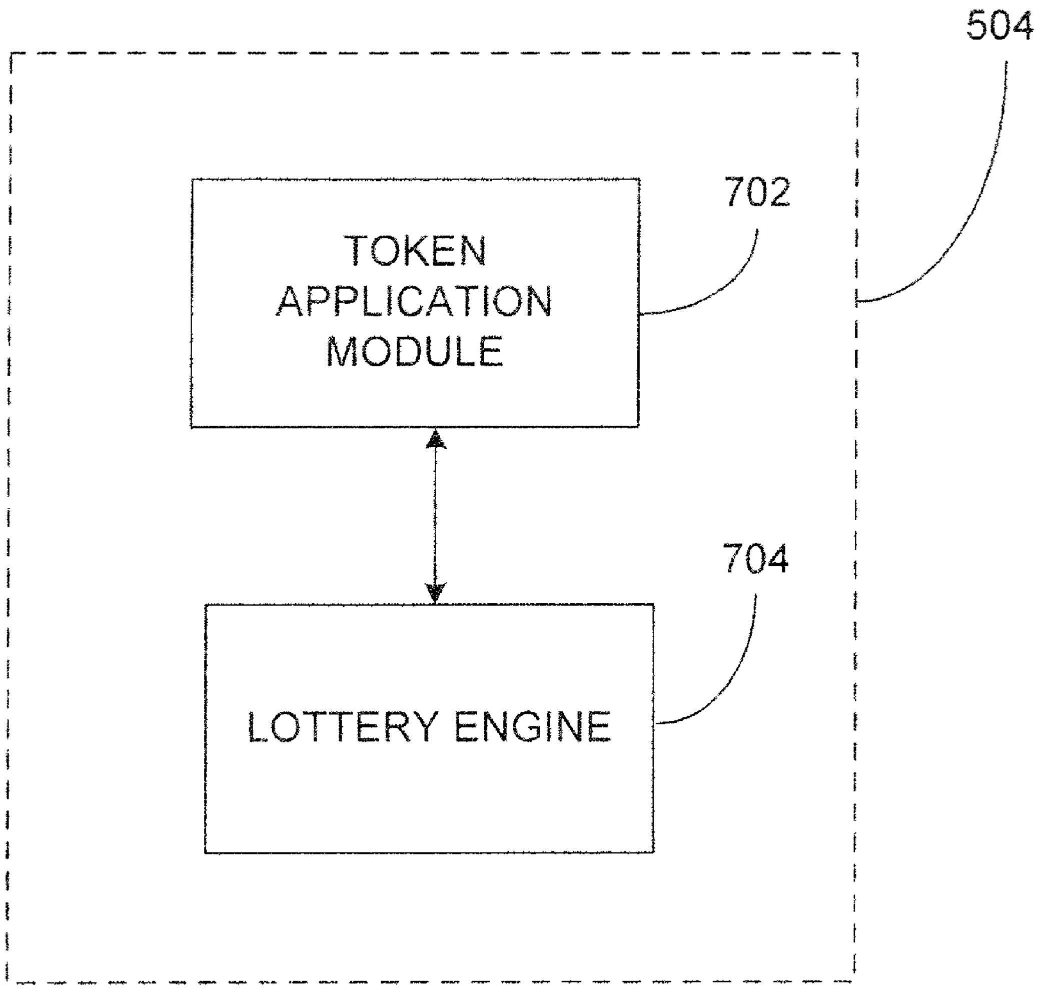
FIG. 7 is a block diagram illustrating an exemplary lottery services module for the application of FIG. 5.

The lottery services module 504 is responsible for all aspects of the lotterized video game that relate directly to the lotterized features incorporated into the interactive game. FIG. 7 is a simplified exemplary embodiment of the lottery services module 504. A token application module 702 manages the application of tokens and when applied properly, cooperates with a lottery engine 704, which is responsible for the actual draws and validating of wins.

Referring back to FIG. 5, the virtual currency module 506 is used by both the gaming engine module 502 and the lottery services module 504 in that it is involved in issuing and managing credits, gifts, and tokens. Tokens are to be carefully controlled within the gaming environment since they can be redeemed for real world prizes such as cash and other goods. Credits are purchased by the player and used at will to purchase virtual goods. The impact of credits within the game play instance is different from the impact of tokens and therefore, they are to be managed separately. Similarly, the game dynamics can also be modified through a controlled management of gifts. The virtual economy within the game is to be kept at an appropriate equilibrium with regards to the allocation of tokens, credits, and gifts via careful management from the virtual currency module 506.

Figure 8:
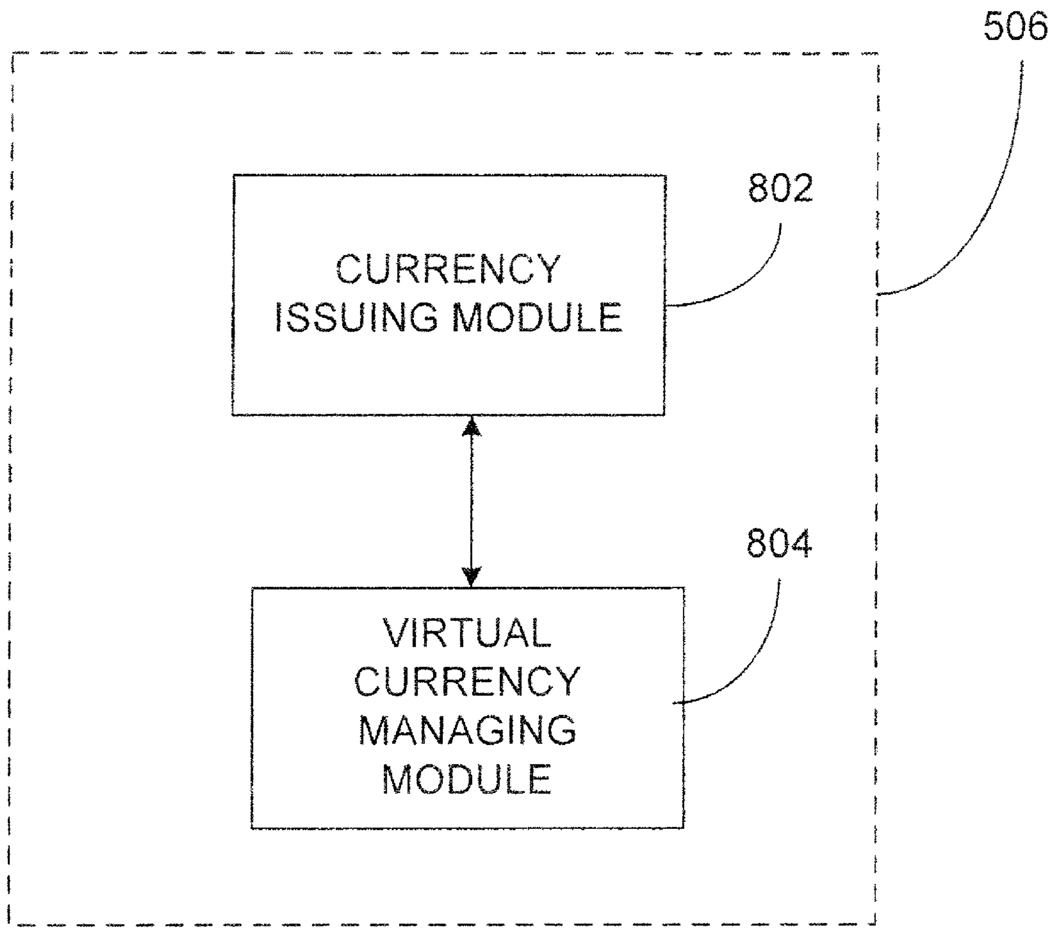
FIG. 8 is a block diagram illustrating an exemplary virtual currency module for the application of FIG. 5.
Figure 9:
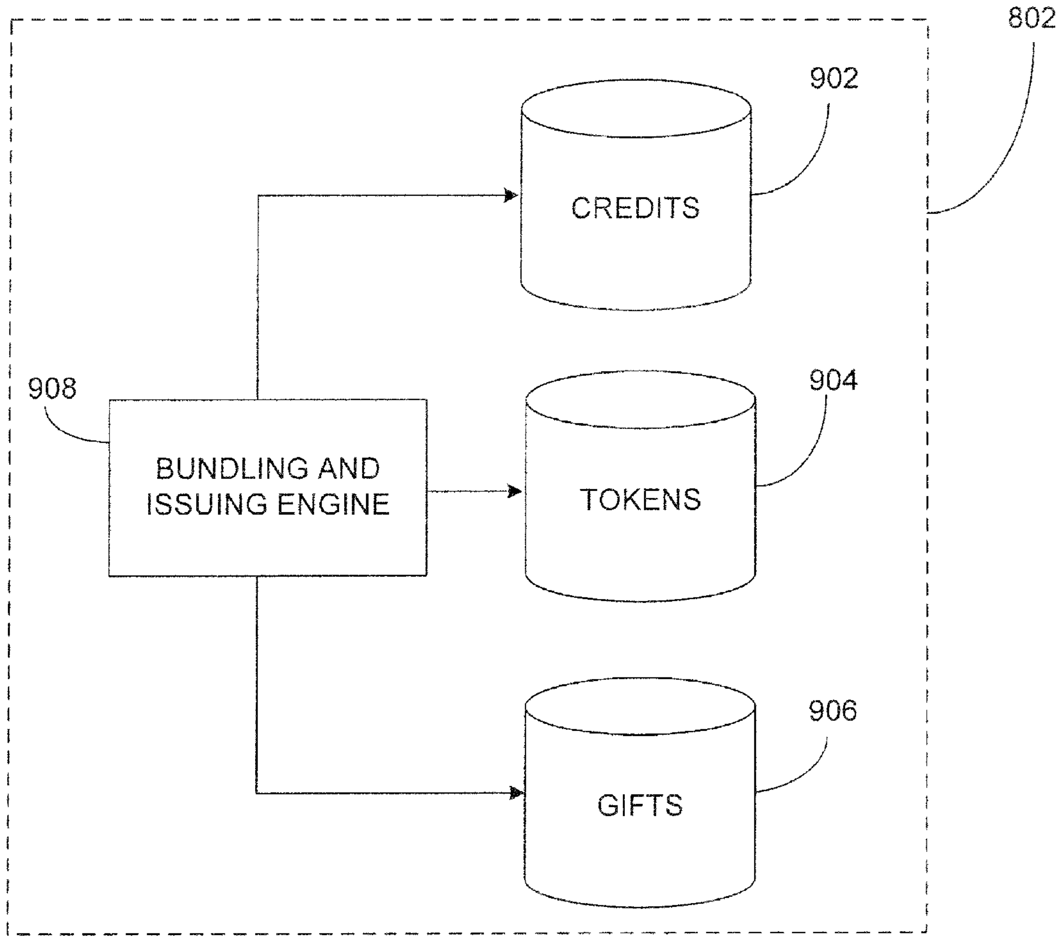
FIG. 9 is a block diagram illustrating an exemplary currency issuing module for the virtual currency module of FIG. 8.

FIG. 8 illustrates a simplified exemplary embodiment of the virtual currency module, which is mainly responsible for issuing and managing the virtual currencies. A currency issuing module 802, illustrated in more detail in FIG. 9, accepts requests for virtual currencies. As stated above, the requests may be on a one-time basis per player, on a subscription basis, or in the form of multiple mini-transactions. A bundling and issuing engine 908 will, as a function of the requests, access one or more databases containing the credits 902, tokens 904, and gifts 906. The virtual currencies are bundled together in accordance with a set of rules set out by the game operator and issued to the player accordingly. A virtual currency managing module 804 inside the virtual currency module 506 is then responsible for managing use and application of the various virtual currencies.

Figure 10:
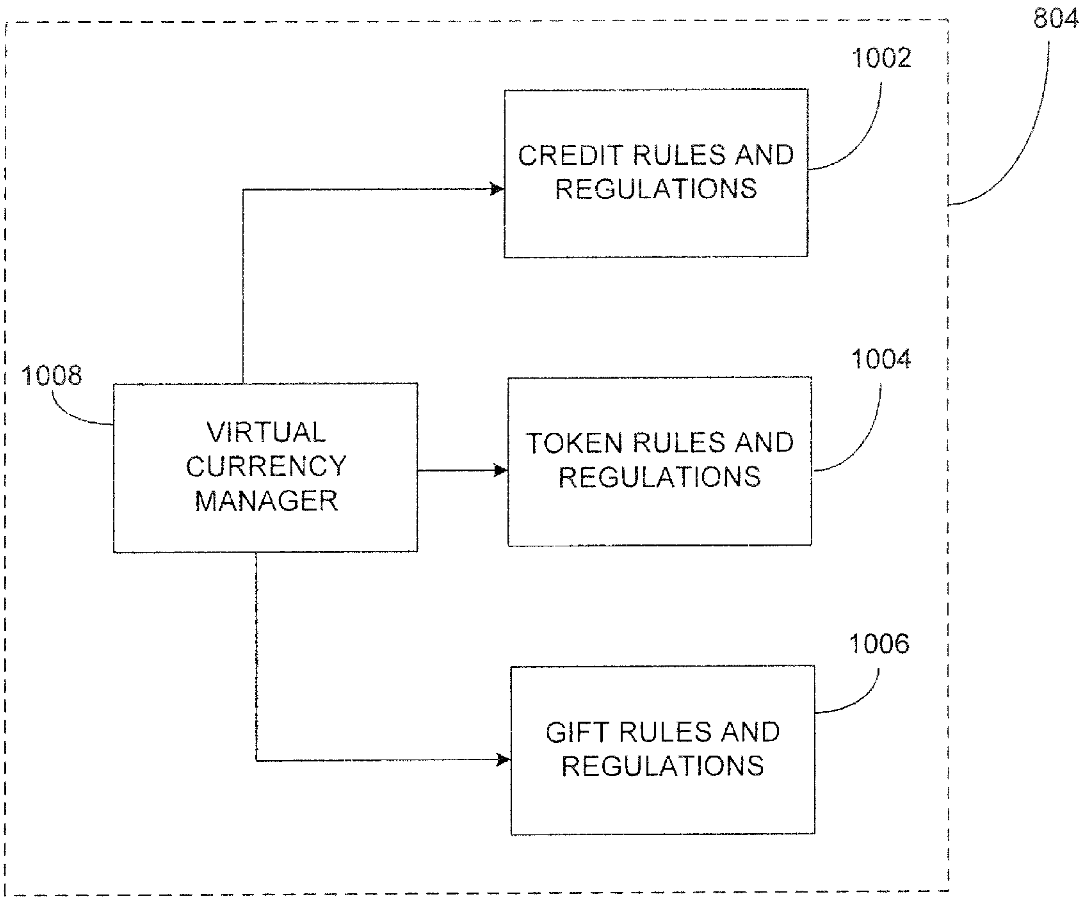
FIG. 10 is a block diagram illustrating an exemplary managing module for the virtual currency module of FIG. 8.

FIG. 10 illustrates in more detail an exemplary virtual currency managing module 804. A separate set of rules and regulations each dictate the use and application of the various virtual currencies. For example, the credit rules and regulations 1002 impose a limit on the number of credits that may be purchased, regulate the number of credits that are needed for a given action in the interactive video game, and validate each use of the credits in accordance with the rules and regulations using a virtual currency manager 1008. Similarly, the token rules and regulations 1004 may impose limits on token acquisition and token use, and the virtual currency manager 1008 ensures that these rules and regulations are followed. Also similarly, the gift rules and regulations 1006 may impose limits on gift acquisition and gift use, and the virtual currency manager 1008 ensures that these rules and regulations are followed.

Figure 11:
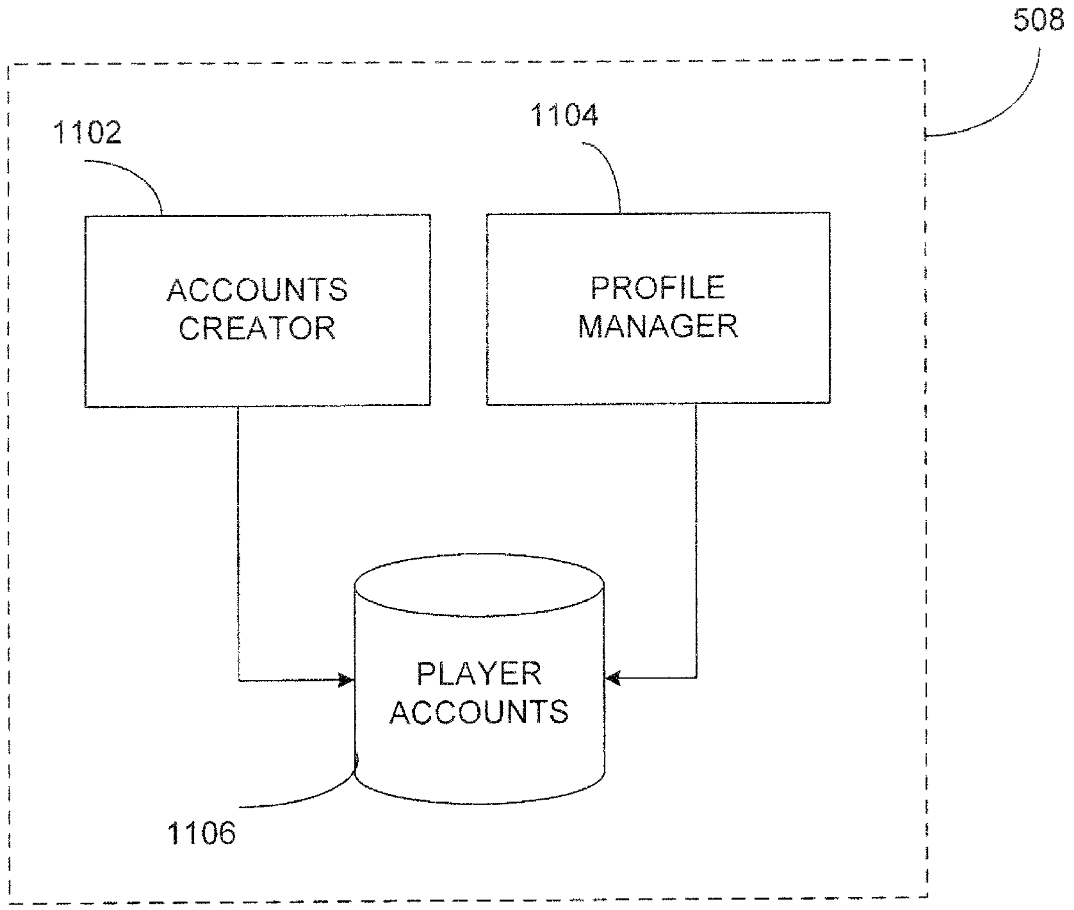
FIG. 11 is a block diagram illustrating an exemplary player account manager for the application of FIG. 5.

FIG. 11 illustrates in more detail the player account manager 508 of FIG. 5. An accounts creator 1102 handles the creation of the account, acquisition of personal information of the player, acquisition of financial information of the player, and the general creation of a player profile. The player accounts/profiles are maintained in a database 1106 and updated by a profile manager 1104. The profile manager 1104 will update the player accounts 1106 whenever new information is available for a player. The new information may have to do with game statistics, updated personal information, updated financial information, leader board data, prizes won, etc.

The following is an exemplary description of the interaction of the various modules of FIGS. 4 to 10 in accordance with game play. When a player launches application 106*a* on his client device 410, the player account manager 508 will either set up a new account for a new player or access an existing account for an existing player. In the case of a new player, various required information is obtained from the player and recorded in the player account database 1106.

An existing player may continue an existing game or start a new game, while a new player will necessarily start a new game. To start a new game, the player must purchase a virtual currency bundle. The bundling and issuing engine 908 will cooperate with the transaction module 510 in order to perform a financial transaction and issue the requested virtual currency bundle. The player account database 1106 is updated with this new information once a virtual currency bundle has been purchased.

An existing game can be accessed by the player using the gaming engine module 502, which can verify with the player account manager 508 what the player's status is in the existing game. As the player plays the video interactive game, the gaming engine module 502 continues to provide the appropriate graphics, simulate various environments, and apply gaming logic to allow the player to progress in the game.

When a win opportunity is presented, the lottery services module 504 will manage application of the tokens 702 and when appropriate, perform lottery draws and award real world prizes accordingly. The transaction module 510 will be involved in the transactional aspects of the lottery draws and the player account manager 508 is updated with any new information to the player's account.

While illustrated in the block diagrams as groups of discrete components communicating with each other via distinct data signal connections, it will be understood by those skilled in the art that the present embodiments are provided by a combination of hardware and software components, with some components being implemented by a given function or operation of a hardware or software system, and many of the data paths illustrated being implemented by data communication within a computer application or operating system. The structure illustrated is thus provided for efficiency of teaching the present embodiment.

It should be noted that the present invention can be carried out as a method, can be embodied in a system, a computer readable medium or an electrical or electro-magnetic signal. The embodiments of the invention described above are intended to be exemplary only. The scope of the invention is therefore intended to be limited solely by the scope of the appended claims.

The invention claimed is:

1. A system for executing an interactive video game having a lotterized component, the system comprising:

- at least one computer server communicable with at least one client computing device over a network, the server having a processor and a memory;
- a gaming engine module stored on the memory and executable by the processor, the gaming engine module having program code that when executed, generates an interactive game play instance playable on the client computing device;
- a lottery services module stored on the memory and executable by the processor, the lottery services module having program code that when executed, conducts a real world lottery transaction within the game play instance; and
- a virtual currency module stored on the memory and executable by the processor, the virtual currency module having program code that when executed, issues and manages separately credits for purchasing virtual goods in the game play instance, tokens applicable within the game play instance for participating in the real world lottery, and gifts representative of virtual goods exchangeable between players,
- wherein the gaming engine module further comprises program code that when executed, generates the game play instance as a collecting game of the virtual goods to form pre-defined sets thereof,
- wherein the lottery services module further comprises program code that when executed, generates a real lottery ticket by receiving a real lottery ticket transaction request within the game play instance,
- wherein the gaming engine module further comprises program code that when executed, generates the real lottery ticket request as a result of an action taken by at least one of the players in the collecting game, and
- wherein the gaming engine module further comprises program code that when executed, generates the real lottery ticket request when at least one of the tokens is applied to a completed one of the pre-defined sets of virtual goods.

2. The system of claim 1, wherein the virtual currency module further comprises program code that when executed, issues the credits, tokens, and gifts as virtual currency bundles.

3. The system of claim 2, wherein the virtual currency module further comprises program code that when executed, allocates the credits, tokens, and gifts in the virtual currency bundles in accordance with pre-defined combinations.

4. The system of claim 1, wherein the virtual currency module further comprises program code that when executed, issues gifts representative of virtual goods that cannot be purchased using the credits within the game play instance and are required to advance in the interactive video game.

5. The system of claim 1, wherein the lottery services module further comprises program code that when executed, sets as a prize for the real world lottery transaction a real world equivalent of at least one of the virtual goods from the completed one of the pre-defined.

6. The system of claim 1, wherein the gaming engine module further comprises program code that when executed, generates the game play instance for the collecting game as a simulated environment where the players may enter and exit different venues to purchase the virtual goods, and the players are free to circulate within the simulated environment.

7. The system of claim 1, wherein the gaming engine module further comprises program code that when executed, requires the players to purchase virtual goods of increasing value as the game progresses, and provides the player with opportunities to win real world equivalents of the virtual goods after each completion of a pre-defined set via the real world lottery transaction.

8. The system of claim 1, wherein the lottery services module further comprises program code that when executed, generates a real lottery ticket issued from a government sanctioned lottery authority.

9. A computer-implemented method for providing an interactive video game having a lotterized component, the method comprising executing on a processor program code for:

- generating an interactive game play instance playable on the client computing device;
- conducting a real world lottery transaction within the game play instance; and
- issuing and managing separately virtual currency in the interactive video game, the virtual currency comprising credits for purchasing virtual goods in the game play instance, tokens applicable within the game play instance for participating in the real world lottery, and gifts representative of virtual goods exchangeable between players,
- wherein generating the interactive game play instance comprises generating the game play instance as a collecting game of the virtual goods to form pre-defined sets thereof,
- wherein conducting the real world lottery transaction comprises generating a real lottery ticket by receiving a real lottery ticket transaction request within the game play instance,
- wherein generating the interactive game play instance comprises generating the real lottery ticket request as a result of an action taken by at least one of the players in the collecting game, and
- wherein generating the real lottery ticket request comprises generating the real lottery ticket request when at least one of the tokens is applied to a completed one of the pre-defined sets of virtual goods.

10. The computer-implemented method of claim 9, wherein issue and managing the virtual currency comprises issuing the credits, tokens, and gifts as virtual currency bundles.

11. The computer-implemented method of claim 10, wherein issuing the credits, tokens, and gifts as virtual currency bundles comprises allocating the credits, tokens, and gifts in the virtual currency bundles in accordance with pre-defined combinations.

12. The computer-implemented method of claim 9, wherein the gifts comprises issuing gifts representative of virtual goods that cannot be purchased using the credits within the game play instance and are required to advance in the interactive video game.

13. The computer-implemented method of claim 9, wherein conducting the real world lottery transaction comprises setting as a prize for the real world lottery transaction a real world equivalent of at least one of the virtual goods from the completed one of the pre-defined.

14. The computer-implemented method of claim 9, wherein generating the game play instance as a collecting game comprises generating the game play instance for the collecting game as a simulated environment where the players may enter and exit different venues to purchase the virtual goods, and the players are free to circulate within the simulated environment.

15. The computer-implemented method of claim 9, wherein generating the game play instance comprises requiring the players to purchase virtual goods of increasing value as the game progresses, and providing the player with opportunities to win real world equivalents of the virtual goods after each completion of a pre-defined set via the real world lottery transaction.

16. The computer-implemented method of claim 9, wherein conducting a real world lottery transaction comprises generating a real lottery ticket issued from a government sanctioned lottery authority.

* * * * *

UNITED STATES PATENT AND TRADEMARK OFFICE

CERTIFICATE OF CORRECTION

PATENT NO. : 8,784,178 B2
APPLICATION NO. : 13/345923
DATED : July 22, 2014
INVENTOR(S) : Adams et al.

It is certified that error appears in the above-identified patent and that said Letters Patent is hereby corrected as shown below:

In the Specification,

Column 4, line 9, “weekly;” should read “weekly,”

Column 4, line 46, “level one” should read “level 1”

Column 5, line 12, “Players ca win” should read “Players can win”

Column 5, line 17, “sending a fried” should read “sending a friend”

Column 6, line 48, “(GPUNPU)” should read “(GPU/VPU)”

In the Claims,

Column 10, line 19, “pre-defined.” should read “pre-defined sets.”

Column 11, line 2, “wherein issue and” should read “wherein issuing and”

Signed and Sealed this
Eleventh Day of November, 2014

Michelle K. Lee
*Deputy Director of the United States Patent and Trademark Office*